US012701420B2

(12) United States Patent
Pateromichelakis et al.

(10) Patent No.: US 12,701,420 B2
(45) Date of Patent: Aug. 4, 2026

(54) MANAGING END-TO-END DATA PROTECTION

(71) Applicant: Lenovo (Singapore) Pte. Ltd., New Tech Park (SG)

(72) Inventors: Emmanouil Pateromichelakis, Viersen (DE); Sheeba Backia Mary Baskaran, Friedrichsdorf (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 321 days.

(21) Appl. No.: 18/256,612

(22) PCT Filed: Dec. 8, 2020

(86) PCT No.: PCT/EP2020/085120
§ 371 (c)(1),
(2) Date: Jun. 8, 2023

(87) PCT Pub. No.: WO2022/122127
PCT Pub. Date: Jun. 16, 2022

(65) Prior Publication Data
US 2024/0098500 A1　　Mar. 21, 2024

(51) Int. Cl.
*H04W 12/72* (2021.01)
*H04W 12/033* (2021.01)
(Continued)

(52) U.S. Cl.
CPC ......... *H04W 12/35* (2021.01); *H04W 12/033* (2021.01); *H04W 12/037* (2021.01); *H04W 12/72* (2021.01)

(58) Field of Classification Search
CPC .............................. H04W 12/35; H04W 12/72
See application file for complete search history.

(56) References Cited

U.S. PATENT DOCUMENTS 9,949,111 B2 * 4/2018 Wane .................... H04W 12/35
2004/0261116 A1 * 12/2004 Mckeown ........... H04L 61/5014
725/109
(Continued)

FOREIGN PATENT DOCUMENTS

EP 3582439 A1 12/2019
WO WO-2019158213 A1 * 8/2019 .............. H04W 8/18

OTHER PUBLICATIONS

PCT/EP2020/085120, "International Search Report and the Written Opinion of the International Searching Authority, or the Declaration", International Searching Authority, Sep. 29, 2021, pp. 1-13.
(Continued)

*Primary Examiner* — William S Powers
(74) *Attorney, Agent, or Firm* — Kunzler Needham Hilton

(57) ABSTRACT

Apparatuses, methods, and systems are disclosed for managing the end-to-end ("e2e") data protection. One apparatus includes a transceiver that receives, from an application server, a management requirement for managing e2e data protection for at least one service. The apparatus includes a processor that obtains at least one digital identifier ("DIG-ID") of at least one client device for the at least one service in response to receiving the management requirement and verifies the at least one DIG-ID with a distributed transaction verification network. The transceiver further sends a request to a mobile communication network, the request providing the at least one verified DIG-ID, and sends a trigger event to the at least one client device for connecting to the mobile communication network using the at least one verified DIG-ID.

20 Claims, 8 Drawing Sheets

(51) Int. Cl.
    *H04W 12/037*    (2021.01)
    *H04W 12/30*    (2021.01)

(56) References Cited

U.S. PATENT DOCUMENTS

| | | | | |
|---|---|---|---|---|
| 2010/0002722 | A1* | 1/2010 | Porat | H04L 45/02 |
| | | | | 370/467 |
| 2014/0075571 | A1* | 3/2014 | Jackson | G06F 16/211 |
| | | | | 726/28 |
| 2017/0078333 | A1* | 3/2017 | Tevlin | H04W 12/069 |
| 2019/0014124 | A1* | 1/2019 | Reddy | H04L 41/5019 |
| 2019/0075448 | A1* | 3/2019 | Prakash | H04M 1/72445 |
| 2021/0021993 | A1* | 1/2021 | Yang | H04W 12/0433 |
| 2021/0392495 | A1* | 12/2021 | Tsiatsis | H04W 12/0433 |
| 2022/0129475 | A1* | 4/2022 | Thaw | H04L 9/3247 |

OTHER PUBLICATIONS

Witanto et al., "Blockchain-based OCF Firmware Update (abstract)", 2019 International Conference on Information and Communication Technology Convergence, IEEE, Oct. 16, 2019, pp. 1248-1253.

Gebresilassie et al., "Distributed, Secure, Self-Sovereign Identity for IoT Devices", 2020 IEEE 6th World Forum on Internet of Things, IEEE, Jun. 2, 2020, pp. 1-6.

3GPP, "3rd Generation Partnership Project; Technical Specification Group Services and System Aspects; Study on support of the 5GMSG Service; (Release 17)", 3GPP TR 23.700-24 V1.2.0, Nov. 2020, pp. 1-170.

3GPP, "3rd Generation Partnership Project; Technical Specification Group Services and System Aspects; Study on application layer support for Factories of the Future in 5G network; (Release 17)", 3GPP TR 23.745 V1.2.0, Nov. 2020, pp. 1-73.

3GPP, "3rd Generation Partnership Project; Technical Specification Group Services and System Aspects; Study on application layer support for Unmanned Aerial Systems (UAS); (Release 17)", 3GPP TR 23.755 V0.12.0, Nov. 2020, pp. 1-50.

3GPP, "3rd Generation Partnership Project; Technical Specification Group Services and System Aspects; Application layer support for Vehicle-to-Everything (V2X) services; Functional architecture and information flows; (Release 16)", 3GPP TS 23.286 V16.4.0, Sep. 2020, pp. 1-64.

3GPP, "3rd Generation Partnership Project; Technical Specification Group Services and System Aspects; Service Enabler Architecture Layer for Verticals (SEAL); Functional architecture and information flows; (Release 16)", 3GPP TS 23.434 V16.5.0, Sep. 2020, pp. 1-123.

3GPP, "3rd Generation Partnership Project; Technical Specification Group Services and System Aspects; Procedures for the 5G System (5GS); Stage 2 (Release 16)", 3GPP TS 23.502 V16.6.0, Sep. 2020, pp. 1-597.

3GPP, "3rd Generation Partnership Project; Technical Specification Group Services and System Aspects; Architecture for enabling Edge Applications; (Release 17)", 3GPP TS 23.558 V1.2.0, Nov. 2020, pp. 1-131.

* cited by examiner

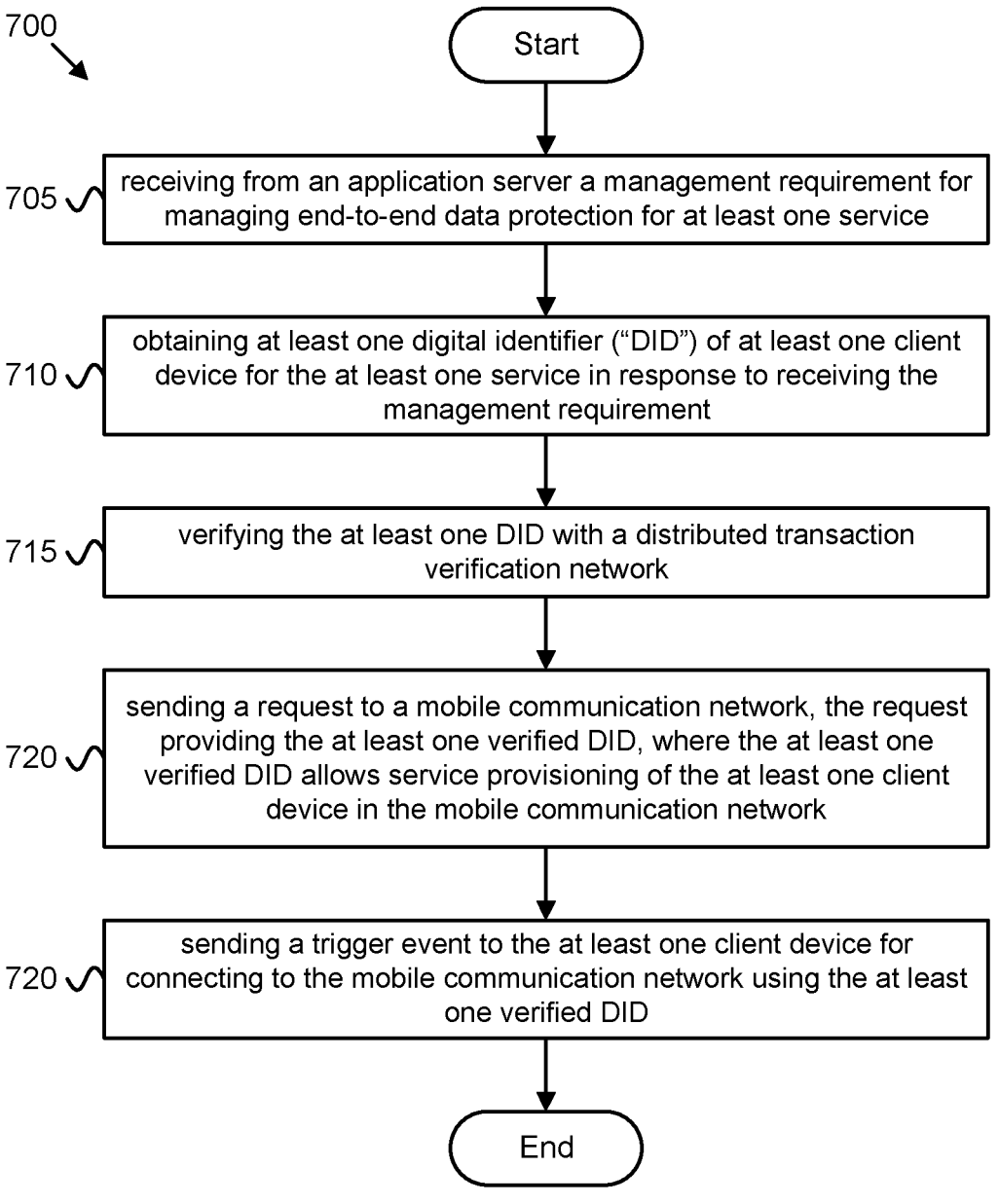

700

Start

705 — receiving from an application server a management requirement for managing end-to-end data protection for at least one service 710 — obtaining at least one digital identifier ("DID") of at least one client device for the at least one service in response to receiving the management requirement 715 — verifying the at least one DID with a distributed transaction verification network 720 — sending a request to a mobile communication network, the request providing the at least one verified DID, where the at least one verified DID allows service provisioning of the at least one client device in the mobile communication network 720 — sending a trigger event to the at least one client device for connecting to the mobile communication network using the at least one verified DID End

FIG. 7

MANAGING END-TO-END DATA PROTECTION

FIELD

The subject matter disclosed herein relates generally to wireless communications and more particularly relates to providing for managing the end to end data protection using DLT-enabled verification.

BACKGROUND

The following abbreviations are herewith defined, at least some of which are referred to within the following description: Third Generation Partnership Project ("3GPP"), Fifth Generation System ("5GS"), Authentication, Authorization and Accounting ("AAA"), Application Function ("AF"), Automated Guided Vehicle ("AGV"), Access and Mobility Management Function ("AMF"), Anti-Money Laundering ("AML"), Positive-Acknowledgment ("ACK"), Application Programming Interface ("API"), Access Stratum ("AS"), Application Service Provider ("ASP"), Base Station ("BS"), Core Network ("CN"), Control Plane ("CP"), Data Network ("DN"), Decentralized Identifier ("DID"), Digital Identifier ("DIG-ID"), Downlink ("DL"), Distributed Ledger Technology ("DLT"), DN Name ("DNN"), Distributed Transaction Verification Network ("DTVN"), Edge Application Server ("EAS"), Edge Computing Service Provider ("ECSP"), Edge Data Network ("EDN"), Edge Enabler Client ("EEC"), Edge Enabler Server ("EES"), Evolved Node-B ("eNB"), Evolved Packet Core ("EPC"), Factory of the Future ("FF"), FF Application Enabler ("FAE"), FAE Client ("FAE-C"), FAE Server ("FAE-S"), Fully Qualified Domain Name ("FQDN", also referred to as an "absolute domain name"), New Generation (i.e., 5G) Node-B ("gNB"), General Packet Radio Service ("GPRS"), Generic Public Service Identifier ("GPSI"), Global System for Mobile Communications ("GSM"), Home Subscriber Server ("HSS"), Internet-of-Things ("IoT"), Identity Management ("IM"), Know Your Customer ("KYM"), Long Term Evolution ("LTE"), Mobile Edge Computing ("MEC"), Massive IoT ("mIoT"), Mobility Management Entity ("MME"), Mobile Network Operator ("MNO"), Negative-Acknowledgment ("NACK") or ("NAK"), New Radio ("NR", a 5G radio access technology; also referred to as "5G NR"), Non-Access Stratum ("NAS"), Non-Public Network ("NPN"), Network Slice Selection Assistance Information ("NSSAI"), Original Equipment Manufacturer ("OEM"), Operating System Identifier ("OSid"), Over-the-Air ("OTA"), Packet Data Unit ("PDU", used in connection with 'PDU Session'), Partially Qualified Domain Name ("PQDN", also referred to as a "relative domain name"), Policy Control Function ("PCF"), Public Land Mobile Network ("PLMN"), Quality of Experience ("QoE"), Quality of Service ("QoS"), Radio Access Network ("RAN"), Service Enabler Architecture Layer ("SEAL"), Session Management Function ("SMF"), Service Provider ("SP"), Single Network Slice Selection Assistance Information ("S-NSSAI"), Self-Sovereign Identity ("SSI"), Subscription Concealed Identifier ("SUCI"), Subscription Permanent Identifier ("SUPI"), Time Sensitive Networking ("TSN"), Trust Service Provider ("TSP"), Vehicle-to-Everything ("V2X"), Vehicle-to-Infrastructure ("V2I"), Vehicle-to-Vehicle ("V2V"), V2X Application Enabler ("VAE"), VAE Client ("VAE-C"), VAE Server ("VAE-S"), Unified Data Management ("UDM"), User Data Repository ("UDR"), User Entity/Equipment (Mobile Terminal) ("UE"), Uplink ("UL"), User Plane ("UP"), User Plane Function ("UPF"), Universal Mobile Telecommunications System ("UMTS"), Vertical Application Layer ("VAL"), and Worldwide Interoperability for Microwave Access ("WiMAX").

Certain wireless communication systems support vertical applications using Distributed Ledger Technology ("DLT"). There are three types of DLTs: Public DLT (aka Permission-less ledgers), Consortium DLT and Private DLT (aka Permissioned ledgers). The key concepts of DLT are 1) the use of a shared Ledger which is available over all nodes at the DLT network, 2) Smart Contracts which are transaction protocols to enable the automatic execution of micro transactions, and 3) Consensus to verify transactions by majority voting among DLT-enabled nodes.

BRIEF SUMMARY

Disclosed are procedures for managing the end to end data protection using DLT-enabled verification. A first method of a trusted application entity (e.g., middleware) for managing the end to end data protection using DLT-enabled verification includes receiving from an application server a management requirement for managing e2e data protection for at least one service and obtaining at least one digital identifier ("DIG-ID") of at least one client device for the at least one service in response to receiving the management requirement. The first method includes verifying the at least one DIG-ID with a DTVN. In one embodiment, the DTVN comprises a TSP. In another embodiment, the DTVN comprises a DLT network, such as a blockchain network.

The first method includes sending a request to a mobile communication network (e.g., PLMN, NPN, MNO, CN), the request providing the at least one verified DIG-ID (for the at least one IoT device). In such embodiments, the at least one verified DIG-ID allows service provisioning of the at least one client device in the mobile communication network (e.g., the network the enabler has chosen for this transaction). The first method includes sending a trigger event to the at least one client device (having verified digital identifiers) for connecting to the mobile communication network using the at least one verified DIG-ID.

A second method of a trusted application entity (e.g., middleware) for managing the end to end data protection using DLT-enabled verification includes receiving user plane data for verification for at least one client device based on an accepted user plane transaction. The second method includes verifying the user plane data with a DTVN and receiving a verification result from the DTVN. The second method includes sending the user plane data to the at least one client device, based on the successful verification result and/or the verified distributed ledger.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a flowchart diagram illustrating one embodiment of a method that may be used for managing the end to end data protection using DLT-enabled verification.

DETAILED DESCRIPTION

Figure 1:
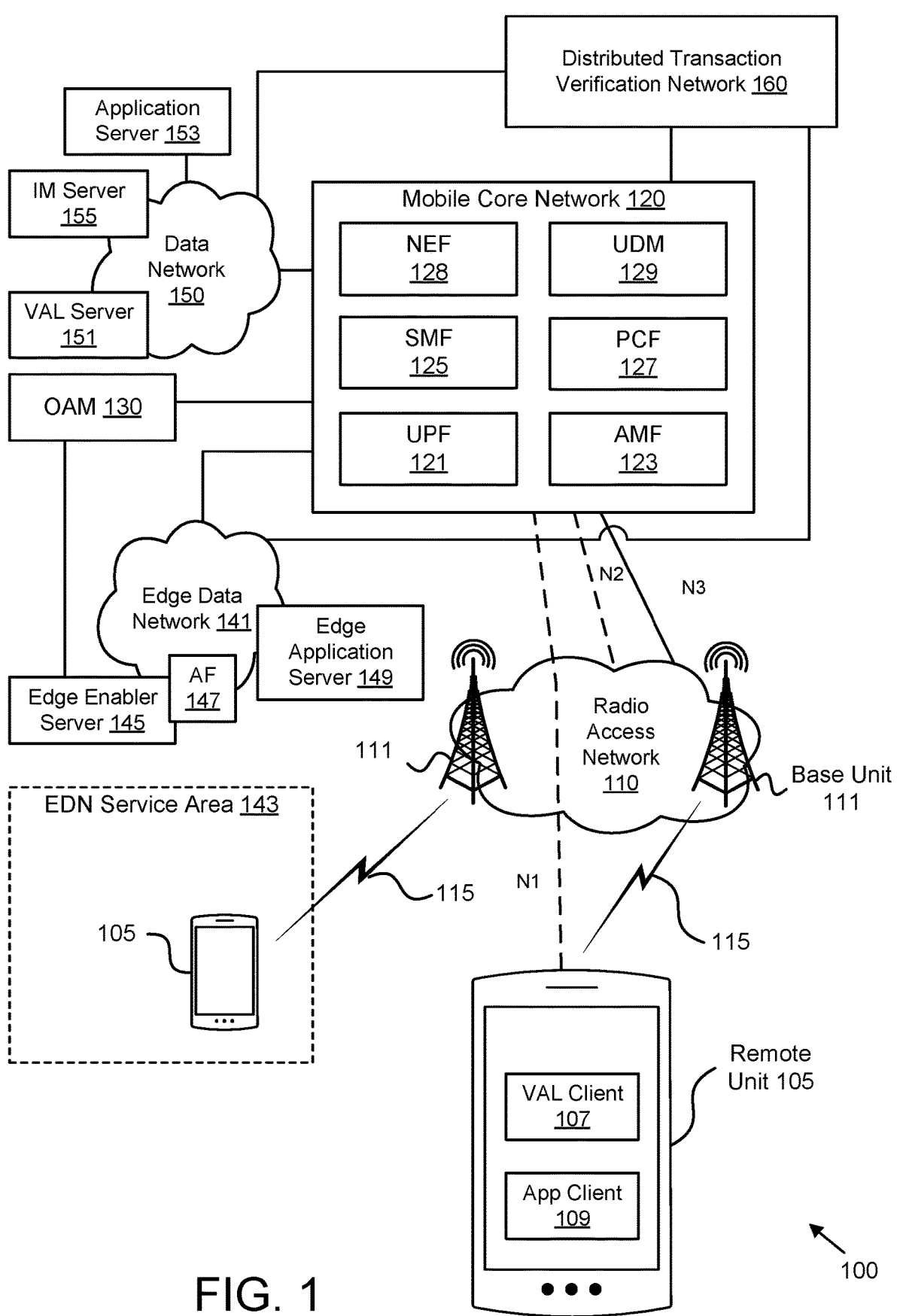
FIG. 1 is a schematic block diagram illustrating one embodiment of a wireless communication system for managing the end to end data protection using DLT-enabled verification.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for managing the end to end data protection using DLT-enabled verification. Disclosed herein are mechanisms/techniques to enable a vertical device (e.g., an IoT device) to register or onboard to a secure and reliable network to perform reliable firmware updates and critical operations (e.g., DLT-enabled transactions).

Blockchain/Distributed Ledger Technology ("DLT") is a promising technology to enhance the vertical applications and is an important component in the application layer over 5G network. Some vertical industries which may benefit from the use of a distributed ledger are related to: Finances (e.g., ID verification (KYC/AML), Financial management, Reduction in the risk of fraud, Payments and P2P transactions and Funding); Healthcare (e.g., Healthcare related sensitive data/record collection and sharing in a secure manner); Commercial/industrial IoT (e.g., Multi-party data exchange, coordination of logistics, automated payments and contracts between IoT devices—such as, AGVs/robots); and Automotive (self-driving cars may do a series of transactions (e.g. toll payment, firmware updates, parking), with no human intervention.

As used herein, DLT is defined as a decentralized database managed by multiple participants, across multiple nodes. Blockchain is a type of DLT where the transactions are recorded with hashes. The transaction is represented as block which is chained with the hash of the previous transaction (hence called blockchain). There are also non-blockchain types of DLT, such as Directed Acyclic Graphs (DAG) which operates using topological ordering, in a tree-like fashion. While the below descriptions of DLT networks may use a blockchain network as an example implementation, the techniques described herein also apply non-blockchain distributed ledger technologies.

There are three types of Block chains: Public Block Chains (aka Permission-less blockchain), Consortium Block Chains and Private Block Chains (aka Permissioned blockchain). The key concepts of Blockchain are 1) the use of a shared Ledger which is available over all nodes at the blockchain network, 2) Smart Contracts which are transaction protocols to enable the automatic execution of micro transactions and 3) Consensus to verify transactions by majority voting among DLT-enabled nodes.

Currently, DLT/blockchain is access agnostic, meaning that the transactions are at the application layer and transparent to the underlying networks. However, with the vertical integration with the 5G networks, and the need for end-to-end data protection and transaction optimization over the 5G system, there are areas where the interworking between the communication part and the application layer is essential to ensure meeting the end-to-end security requirements.

More specifically, for these industries some critical applications which may require joint interworking between the communication and application layer. Examples include, but are not limited to:

Data tamper proof: Vertical industries, such as supply chain finance and insurance, may have strict requirements for data integrity and traceability, also environment data (e.g. temperature and windspeed) for agricultural insurance and warehouse data (e.g. number and weight of goods) for inventory financing. Those services require to guarantee data tamper-proof and data traceability end-to-end; and when 5G is used for the communication, this will impose new requirement for the transaction handling over the 5G domains (RAN, transport, Core network).

Application Credential(s): $3^{rd}$ party identity management systems can issue tamper-proof digital credentials which are verifiable anywhere, without revealing the actual identities. 5G could provide a means of correlating/providing/securely delivering the credentials based on the workflow/data/assets.

Decentralized workflow: Based on smart contract of blockchain, the industry applications could execute decentralized workflow, leveraging the distributed edge of 5G network.

Decentralized identity: Millions of industry devices with self-controlled identity management should be able to perform transactions via 5G networks. To securely register/onboard and provision the services over the 5GS will require efficient identity translation (hiding the real identity of the user over-the-air, but at the same time allowing the MNO to be aware of the real identity of the user to be subscribed for charging and security purposes).

Decentralized identifiers ("DIDs") are a new type of identifier that enables verifiable, decentralized digital identity. A DID identifies any subject (e.g., a person, organization, thing, data model, abstract entity, etc.) that the controller of the DID decides that it identifies. In contrast to typical, federated identifiers, DIDs have been designed so that they may be decoupled from centralized registries, identity providers, and certificate authorities. Specifically, while other parties might be used to help enable the discovery of information related to a DID, the design enables the controller of a DID to prove control over it without requiring permission from any other party.

The DID is a globally unique persistent identifier that does not require a centralized registration authority because it is generated and/or registered cryptographically. DIDs are URIs that associate a DID subject with a DID document allowing trustable interactions associated with that subject.

One key example of critical transaction which may impose strong security and performance requirements over 5G system, especially when DLT/blockchain is used, are the Over-the-air (OTA) firmware updates for the IoT devices. OTA updates for IoT devices enable the manufacturers/OEMs to efficiently update devices that are already deployed for commercial and industrial purposes. Firmware update systems need to provide a guarantee of the validity of a firmware update, blocking malicious updates and keeping legitimate ones. In general, an ideal firmware update system would ensure meeting strict confidentiality, integrity, and availability requirements.

There are various reasons for providing OTA firmware updates, including:

Releasing new features

When manufacturers find bugs from their released products, the firmware updates can provide bug fixes.

The manufacturers need to regularly release updates to prevent cyber-attacks. That final reason is the most crucial one, as it may cause catastrophic damage. For instance, attackers can manipulate the self-driving car's parameters to perform brake failures that may inflict dangerous accidents.

As the number of devices significantly rises, it becomes challenging for the OEM (e.g., IoT device operator) to manage the version control and update process required for every device. In some scenarios, OEMs can construct their own OTA update management systems or push updates through a trusted third party. This has already been the case for large manufacturers. However, smaller, newer IoT manufacturers do not necessarily have this infrastructure in place. Firmware updates that are held on centralized servers are vulnerable to denial-of-service attacks, and this can delay critical patches from being applied to vulnerable devices. Even in the absence of attacks, numerous simultaneous, legitimate update requests can overwhelm a small manufacturer's servers.

Some issues are possible for OTA firmware updates, which may require the end-to-end protection of such transactions via using a DLT-enabled trusted application node (e.g. middleware) can be:

An IoT device may embed one or more microcontrollers and sensors, and these components may be provided by different manufacturers. These manufacturers regularly provide updates for improving their products, solving bugs, and correcting security issues. The installation of a tampered/malicious firmware that compromises one of the components, may impact the whole IoT device. If middleware is used, he may provide a standards way of providing updates for all components of an IoT device.

Hostname and IP addresses must be used to authenticate an IoT device by update servers. This information can be easily spoofed to connect IoT devices to "fake" update servers that may deliver malicious firmware. Here, DIG-IDs may be used and verified via the middleware to avoid such issue.

The network where the IoT devices connect and access is not secure and may allow a malicious node to "pretend" that he is the IoT server and attempt to take the control of the IoT devices by providing malicious firmware. Here, the middleware may steer the traffic towards the most secure network and support the registration and data transfer.

Described below are solutions to enable the fast and reliable vertical (IoT) device registration/onboarding and data delivery over a secure 5G network to perform a DLT-enabled critical operations (e.g. firmware update).

FIG. 1 depicts a wireless communication system 100 for managing the end to end data protection using DLT-enabled verification, according to embodiments of the disclosure. In various embodiments, the wireless communication system 100 includes at least one remote unit 105, a radio access network ("RAN") 110, and a mobile core network 120. The RAN 110 and the mobile core network 120 form a mobile communication network. The RAN 110 may be composed of a base unit 111 with which the remote unit 105 communicates using wireless communication links 115. Even though a specific number of remote units 105, base units 111, wireless communication links 115, RANs 110, and mobile core networks 120 are depicted in FIGS. 1A-1C, one of skill in the art will recognize that any number of remote units 105, base units 111, wireless communication links 115, RANs 110, and mobile core networks 120 may be included in the wireless communication system 100.

In one implementation, the RAN 110 is compliant with the 5G system specified in the 3GPP specifications. In another implementation, the RAN 110 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In FIG. 1, the wireless communication system 100 supports an edge computing service deployment including at least one edge data network ("EDN") 141 supporting an EDN service area 143. The EDN 141 includes at least one Edge Application Server ("EAS") 177 supporting an instance of an application. When a remote unit 105 is located in the EDN service area 143, Edge Application client 179 is able to access the EAS 177. However, when the remote unit 105 is outside any EDN service area, the EA client 179 is able to access an instance of the application using the Application server 171 located in the data network 150 (i.e., a regional data network). The EDN 141 also includes an edge enabler server ("EES") 173, a middleware application enabler server, while the remote unit 105 includes an edge enabler client ("EEC") 175. In other embodiments, the wireless communication system may support an FF vertical and/or a V2X vertical (not depicted).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 111 in the RAN 110 via uplink ("UL") and downlink ("DL") communication signals. Furthermore, the UL and DL communication signals may be carried over the wireless communication links 115. Here, the RAN 110 is an intermediate network that provides the remote units 105 with access to the mobile core network 120. As depicted, the remote unit 105 may include hardware and software resources to run a Vertical Application Layer ("VAL") client and/or a mobile application client 109.

In some embodiments, the remote units 105 communicate with a communication host (e.g., edge application server 149 and/or application server 153) via a network connection with the mobile core network 120. For example, a mobile application (e.g., web browser, media client, telephone/VoIP application, mobile application client 109) in the remote unit 105 may trigger the remote unit 105 to establish a PDU session (or other data connection) with the mobile core network 120 via the RAN 110. The mobile core network 120 then relays traffic between the remote unit 105 and the communication host (i.e., application server) using the PDU session. Note that the remote unit 105 may establish one or more PDU sessions (or other data connections) with the mobile core network 120. As such, the remote unit 105 may concurrently have at least one PDU session for communicating with one application server and at least one additional PDU session for communicating with another application server (not shown).

The base units 111 may be distributed over a geographic region. In certain embodiments, a base unit 111 may also be referred to as an access terminal, an access point, a base, a base station, a Node-B, an eNB, a gNB, a Home Node-B, a relay node, or by any other terminology used in the art. The base units 111 are generally part of a radio access network ("RAN"), such as the RAN 110, that may include one or more controllers communicably coupled to one or more corresponding base units 111. These and other elements of radio access network are not illustrated but are well known generally by those having ordinary skill in the art. The base units 111 connect to the mobile core network 120 via the RAN 110.

The base units 111 may serve a number of remote units 105 within a serving area, for example, a cell or a cell sector, via a wireless communication link 115. The base units 111 may communicate directly with one or more of the remote units 105 via communication signals. Generally, the base units 111 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 111.

In one embodiment, the mobile core network 120 is a 5G core ("5GC") or the evolved packet core ("EPC"), which may be coupled to a packet data network 150, like the Internet and private data networks, among other data networks. A remote unit 105 may have a subscription or other account with the mobile core network 120. Each mobile core network 120 belongs to a single public land mobile network ("PLMN"). The present disclosure is not intended to be limited to the implementation of any particular wireless communication system architecture or protocol.

The mobile core network 120 includes several network functions ("NFs"). As depicted, the mobile core network 120 includes multiple user plane functions ("UPFs") 121. The mobile core network 120 also includes multiple control plane functions including, but not limited to, an Access and Mobility Management Function ("AMF") 123 that serves the RAN 110, a Session Management Function ("SMF") 125, a Policy Control Function ("PCF") 127, a Network Exposure Function ("NEF") 128, and a Unified Data Management function ("UDM") 129. In certain embodiments, the mobile core network 120 may also include an Authentication Server Function ("AUSF"), a Network Repository Function ("NRF") (used by the various NFs to discover and communicate with each other over APIs), or other NFs defined for the 5GC. In some embodiments, the UDM 129 is co-located with a User Data Repository ("UDR").

In various embodiments, the mobile core network 120 supports different types of mobile data connections and different types of network slices, wherein each mobile data connection utilizes a specific network slice. Here, a "network slice" refers to a portion of the mobile core network 120 optimized for a certain traffic type or communication service. A network slice instance may be identified by a S-NSSAI, while a set of network slices for which the remote unit 105 is authorized to use is identified by NSSAI. In certain embodiments, the various network slices may include separate instances of network functions, such as the SMF 125 and UPF 121. In some embodiments, the different network slices may share some common network functions, such as the AMF 123. The different network slices are not shown in FIG. 1 for ease of illustration, but their support is assumed.

The wireless communication system 100 includes an OAM/Management function 130. The OAM/Management function 130 may provide slice parameters (e.g., GSTs) to the enabler servers (e.g., EES 145). In various embodiments, the OAM/Management function 130 performs slice instantiation, e.g., in response to a request from a service provider.

As depicted, the data network 150 may include a VAL server 151, and application server 153 and/or and Identity Management ("IM") server 155. In 3GPP, an application support layer has been specified for vertical applications, known as vertical application enabler layer. Examples of vertical application enablers include the V2X enabler server, the FF enabler server, and the UAS enable server. The vertical application enabler layer may act as a distributed or centralized middleware, which may reside at the MNO or the 3rd party/vertical service provider's domain, for exposing northbound APIs to verticals as well as to provide some server-client support functionalities for the connected devices.

The Service Enabler Architecture Layer ("SEAL") provides an enabler layer common for all verticals. With respect to identification, SEAL is providing a common services platform for Identity Management ("IM") for supporting the verticals to access the 5G system. The IM server 155 is a functional entity that authenticates the vertical application layer user identity; and the identity management client (not shown) is a functional entity who acts as the application client 109 for vertical applications layer ("VAL") user identity related transactions. The VAL server 151 is one embodiment of an enabler server.

Also, there are two models: on-network and off-network models. In on-network model, the identity management client communicates with the identity management server over the IM-UU reference point, whereas for off-network the identity management client of the UE1 communicates with the identity management client of the UE2 over the IM-PC5 reference point. Other vertical specific enabler capabilities discuss the identity management aspects for onboarding/registration. In particular:

FFAPP—which is the study related to the application architecture of Factories of the Future—discusses the issue of device onboarding; and in particular the use of tools such as device management, credentials and subscription management, and network connectivity management. Currently, solutions related to device and identity management are provided using the support from SEAL; however, without any protection of the real IDs while providing connectivity (see 3GPP TS 23.745).

V2XAPP is the study related to V2X and defines a V2X application enabler ("VAE") layer for handling support functionalities for automotive verticals. It uses Identity management server APIs to perform actions related to the V2X-UE identities. Furthermore, for group management of the devices may provide the identity lists over VAE layer; but without any protection of the real IDs (see 3GPP TS 23.286).

5GMARCH is the study related to massive IoT. In this study a MSGin5G Server is defined as the middleware for providing support functionalities for 5G messaging services. Some of the scenarios include the message from Application Server to UE and vice versa. The UEs can be MSGin5G UE type, Legacy 3GPP UE type, Non-3GPP UE type or a combination of them (see 3GPP TR 23.700-24). Identity management is not yet discussed with the scope of the study; however, this will be one consideration since different types of UEs may interact; hence some protection of the IoT device IDs as well as transactions would be needed.

The distributed transaction verification network 160 performs identity and/or transaction verification services. The distributed transaction verification network 160 may include a Trust Service Provider ("TSP") and/or a Distributed Ledger Technology ("DLT") network. As used herein, a DLT network comprises a plurality of nodes sharing a distributed ledger. A distributed ledger is a consensus of replicated, shared, and synchronized digital data geographically spread across multiple sites. One example of a DLT network is a blockchain network where the blockchain is the distributed ledger. With blockchain networks, records—called blocks—are linked together ("chained") using cryptography. For example, each block may include a cryptographic hash of the previous block, a timestamp, and transaction data.

Described herein is a mechanism (e.g., at an application enabler/middleware function which may reside at the 3rd party/service provider (SP) domain or the MNO or a cloud platform provider) for enabling end-to-end trusted (e.g., group-based) registration/onboarding and DLT-enabled service provisioning for IoT devices in a given area (based on application server request). This allows a 3rd party/SP to offer an end-to-end data protection service (through the middleware) for critical vertical transactions (end-to-end refers to between the client device and the application server) and enables a MNO (who will be selected to provide the communication for the service) to offer a standard approach for communication with data integrity to their customers (verticals).

The mechanism has three parts: First, the transaction verification via an external blockchain/DLT network, based on the vertical application request, for group-based onboarding. Second, upon verifying the transaction, the handling of identity translation and single/group IOT device registration trigger to a selected secure 5GS. Third, upon registering and connecting to a secure 5GS, to enable user plane end-to-end data protection by allowing the message delivery over the enabler layer (by also verifying the user plane transaction itself).

Although specific numbers and types of network functions are depicted in FIG. 1, one of skill in the art will recognize that any number and type of network functions may be included in the mobile core network 120. Moreover, where the mobile core network 120 is an EPC, the depicted network functions may be replaced with appropriate EPC entities, such as an MME, S-GW, P-GW, HSS, and the like. In certain embodiments, the mobile core network 120 may include a AAA server.

While FIG. 1 depicts components of a 5G RAN and a 5G core network, the described solutions apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 123 may be mapped to an MME, the SMF mapped to a control plane portion of a PGW and/or to an MME, the UPF map to an SGW and a user plane portion of the PGW, the UDM/UDR maps to an HSS, etc.

In the following descriptions, the term eNB/gNB is used for the base station but it is replaceable by any other radio access node, e.g., BS, eNB, gNB, AP, NR, etc. Further the operations are described mainly in the context of 5G NR. However, the proposed solutions/methods are also equally applicable to other mobile communication systems supporting middleware-assisted slice and/or DNN re-mapping for vertical applications and/or edge network deployments.

Figure 2:
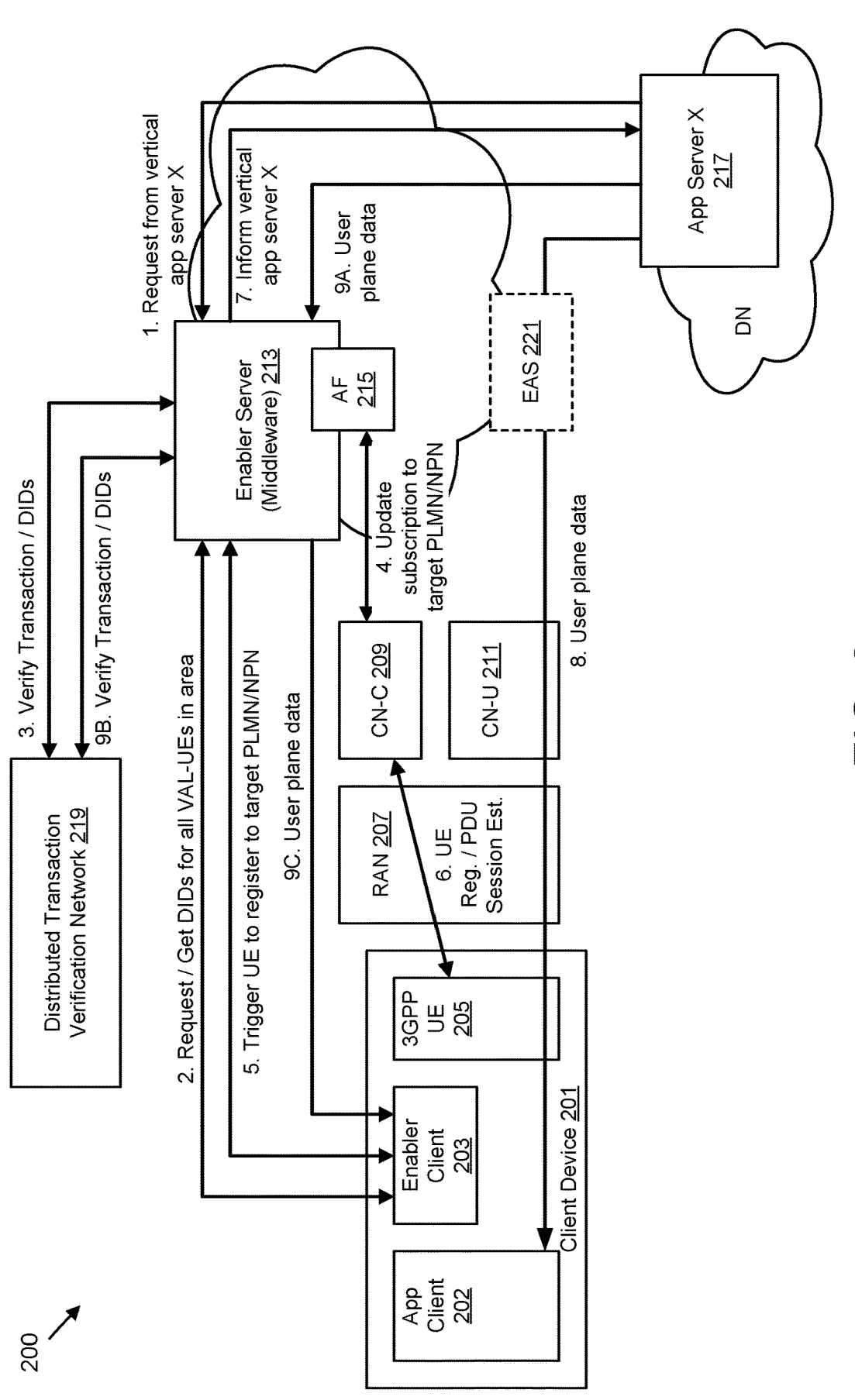
FIG. 2 is a diagram illustrating one embodiment of a procedure for a network architecture and signaling flow for managing the end to end data protection using DLT-enabled verification.

FIG. 2 depicts a network architecture 200 and signaling flow for managing the end-to-end ("e2e") data protection using DLT-enabled verification, according to embodiments of the disclosure. The procedure 200 involves a client device 201 comprising an application client 202, an Enabler client 203, and a 3GPP UE 205. The client device 201 may be one embodiment of the remote unit 105, the application client 202 may be one embodiment of the mobile application client 109 and is at an application layer of the client device 201. The Enabler client 203 may be an embodiment of the VAL client 107 and is at a middleware layer of the client device 201. The 3GPP UE 205 represents the NAS/AS layers of the client device 201.

The architecture 200 also involves a RAN 207, a CN control plane ("CN-C") 209, a CN user plane ("CN-U") 211, an Enabler server 213 (middleware), an application function ("AF") 215 and an application server 'X' 217. The Enabler server 213 may be one embodiment of the VAL server 151 and/or the EES 145, while the application server 217 may be an embodiment of the edge application server 149 and/or the application server 153. In certain embodiments, the Enabler server 213 (middleware) may include AF functionality, for example the Enabler server 213 (middleware) and AF 215 may be co-located or combined into a single entity.

The Application server 217 (i.e., an IoT Server) sends a request to the enabler server 213 for supporting a transaction for a specific area or service group (e.g. OTA firmware updates). This request may be one of the following:

Find the users which need firmware updates in an area (maybe the software version is updated only in some devices)

Find the "best" network to provide updates and create identities for allowing them to register to receive updates Handle control plane aspects for the vertical service to-be-provisioned Handle the end-to-end data protection for a particular user plane transaction delivery The enabler server 213 receives the request and prioritizes it based on the level of "criticality" and the type of the service e.g. DLT-enabled (understands that it is a critical transaction based on the service ID, or the app server ID).

The enabler server 213 requests and receives from the enabler clients 203 in the area (the area is the geographical area served by the enabler server 213. In this area, the enabler server 213 provides capabilities for vertical applications), their digital IDs (from a set of pre-defined digital IDs, which may be pre-configured at the devices by the app server 217).

As used herein, a digital identity ("DIG-ID") refers to a verifiably secure identity (e.g., linked to verifiable credentials of the user that are stored on a trusted and/or decentralized platform, or digital identifier infrastructure associated with an trust service provider ("TSP") and/or an ID service provider. Examples of a DIG-ID include, but are not limited to: a Decentralized Identifier ("DID") and a self-sovereign identifier ("SSI"). While the embodiments of FIG. 2 are described in terms of a Decentralized Identifier, in other embodiments another type of digital ID may be used.

The enabler server 213 verifies the transaction (<app server ID, list app client DIDs, service type ID, transaction ID>) via an (e.g., external) distributed transaction verification network 219, which can be a DLT/blockchain network and/or Trust Service Provider. The verification is done via consensus algorithms at the distributed transaction verification network.

In certain implementations, one or more enabler servers 213 may be deployed in one or more DN/EDNs and can be blockchain-enabled nodes (hence, they may be part of the blockchain network who mines and votes for consensus). Where the enabler server 213 is deployed in an EDN, the EDN may also include an EAS 221 (i.e., one embodiment of the edge application server 149).

The enabler server 213 creates VAL UE IDs and requests the 5GC (UDM) to create new entries for the VAL-UEs within the application, using as identification the VAL UE ID, the DID or the combination of them; and optionally provides the reason for the registration (critical service provisioning).

Note that a DID may be used instead of SUCI or can be used as a SUPI (and will be encrypted to SUCI). In one embodiment, the IoT server (i.e., App server X 217) is subscribed to use one or more 5GS directly or in-directly (subscribed to the middleware e.g. ECSP/SP, and middleware has subscribed to 5GS). The 5GS/UDM (part of CN-C 209) has the subscription information for the application X (e.g., IoT server) but not for the IoT devices (i.e., client devices 201); hence, this step allows the 5GS to get a mapping of the application subscription to requested VAL UE IDs.

The enabler server 213 triggers the relevant client devices 201 (also referred to as "VAL UEs") to register to the target 5GS (providing the cause for registration, e.g. critical service provisioning). The enabler server 213 instructs the VAL UEs to use their DIDs (which are verified) as the SUCI for the registration or the SUPI (which will be used to construct the SUCI). In one embodiment, this instruction can be a groupcast (to selected clients based on DIDs). In another embodiment, this instruction is a broadcast transmission. In the case of broadcast transmission, all application clients 202 will receive it in the given area, but the registration will be performed only for the client devices 201 that have verified DIDs.

VAL-UEs (client devices 201) register to the 5GC and will establish PDU sessions (with current procedures as in 3GPP TS 23.502). Optionally, the 5GS sends an ACK to middleware for all UEs that have successfully registered in 5GS with the verified DID.

The enabler server 213 informs the App server X 217 (e.g., IoT server) about the transaction admission, also including the VAL UE info (VAL UE ID, used DID).

After a client device 201 has connected to the target PLMN/NPN, the App server X 217 (IoT server) starts sending data (firmware updates) to the clients via the target 5GS. This can be done via the application layer (step 8), or via app enabler layer (steps 9).

For user plane data transactions not requiring end to end data protection via the middleware, this is performed from the application server 217 to the application client 202 via the PLMN/NPN. See Step 8.

For user plane data transactions which require the end to end user plane verification over the DLT network (based on the application server subscription/request), this is performed via the application enabler layer to ensure data integrity protection over the middleware layer and the verification of the user plane by the external blockchain network. At Step 9A, the enabler server 213 receives the data. At Step 9B, before pushing the data to the client, the enabler server 213 verifies the data with the distributed transaction verification network 219. This data is added to the ledger, if verified. At Step 9C, the data is sent to the clients via application layer signaling.

Figure 3A:
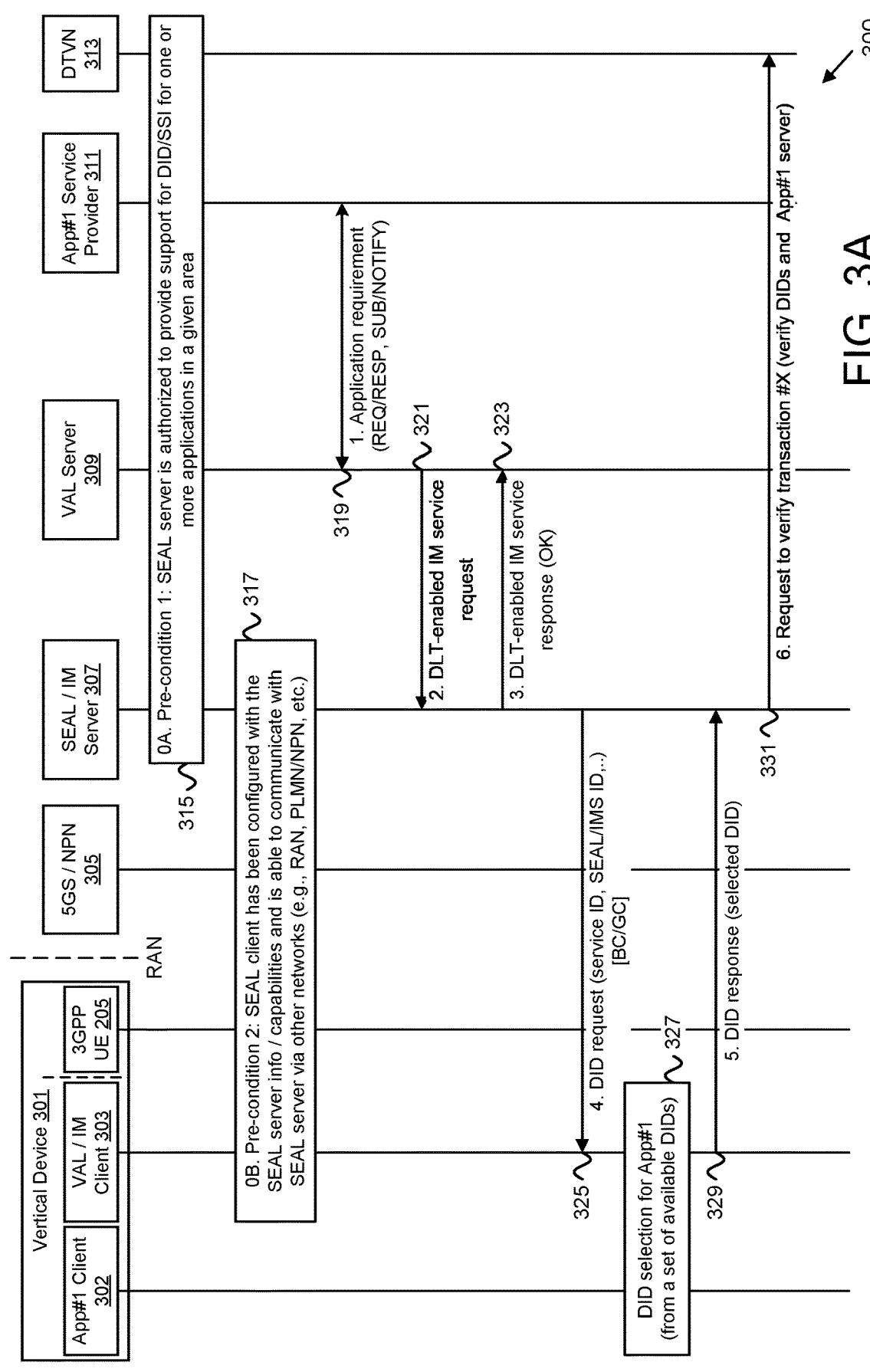
FIG. 3A is a diagram illustrating signaling flow for one embodiment of a procedure for registration support by an enabler layer.
Figure 3B:
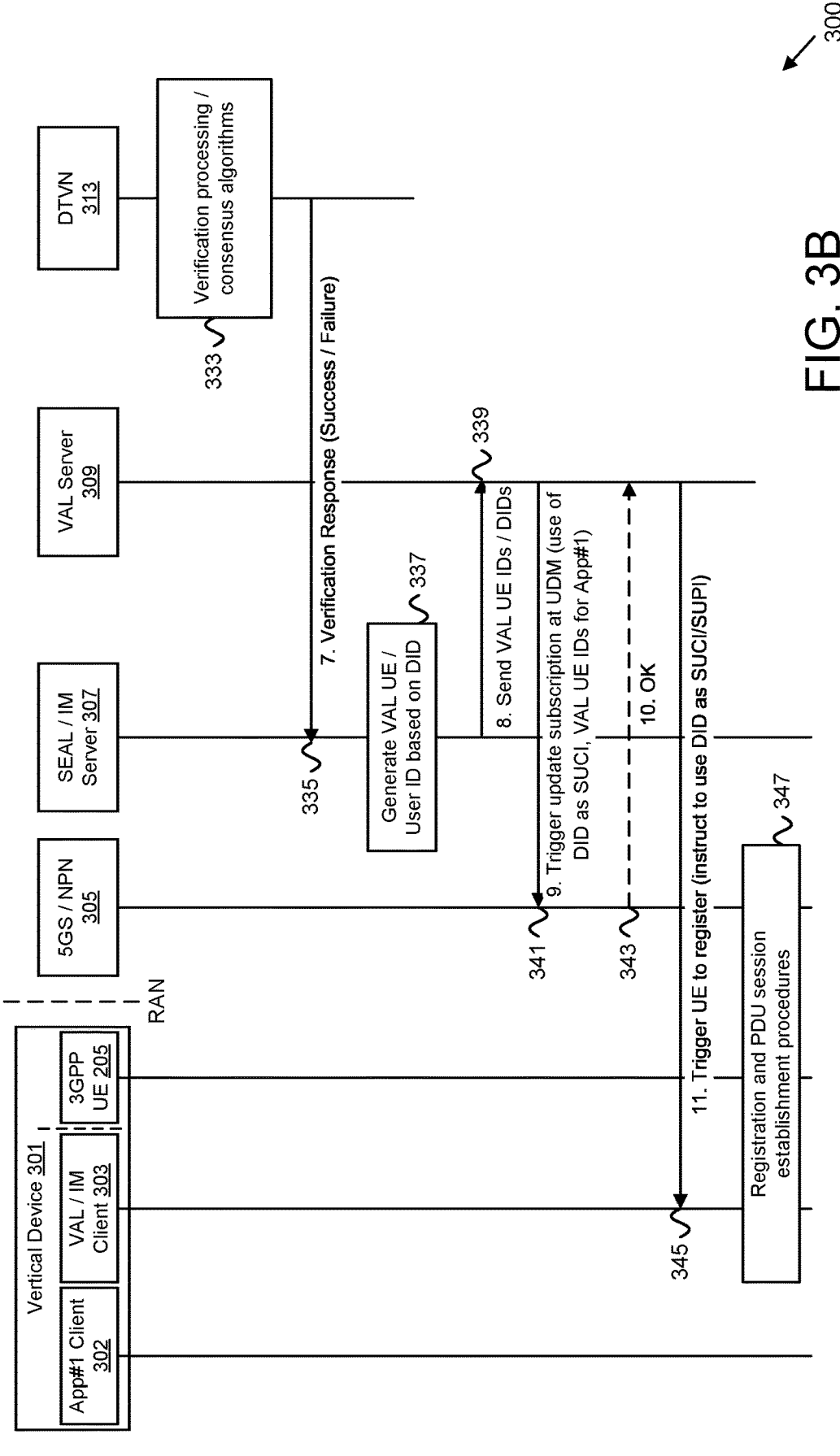
FIG. 3B is a continuation of the procedure in FIG. 3A.

FIGS. 3A-3B depict a procedure 300 for registration support by an enabler layer, according to embodiments of the disclosure. The procedure 300 involves a vertical device 301 comprising an application client 302 for a first application (referred to as "App #1"), a VAL/IM client 303 and the 3GPP UE 205. The App #1 client 302 may be one embodiment of the application client 202 and/or application client 109, and is at an application layer of the vertical device. The VAL/IM client 303 may be an embodiment of the VAL client 107, and is at a middleware layer of the vertical device 301. The procedure 300 also involves a 5GS and/or NPN 305 (which may communicate with the vertical device 301 via a RAN), a SEAL/IM server 307, a VAL server 309, an application service provider 311 for App #1 and a distributed transaction verification network ("DTVN") 313. The VAL server 309 can be an enabler server, may use some services from SEAL. The DTVN 313 is an embodiment of the distributed transaction verification network 160 and may include a Trust Service Provider ("TSP") and/or a Distributed Ledger Technology ("DLT") network, such as a blockchain network.

Turning to the message flow of FIG. 3A, at Step OA, as a first precondition, the SEAL/IM server 307 is authorized to provide support for Digital ID (e.g., decentralized ID and/or Self-Sovereign ID) for one or more application in a given area (see block 315). At Step OB, as a second precondition, the SEAL client (e.g., VAL/IM client 303) has been configured with the SEAL server information and/or capabilities and is able to communicate with the SEAL/IM server 307 via other networks (e.g., via RAN/Wi-Fi, PLMN, etc., see block 317).

At Step 1, an application requirement (e.g. from an IoT server) is sent to the VAL server (e.g. VAE/FAE server) as a request or subscription to consume a particular service request, e.g., for enabling connectivity for a particular OT operation (see messaging 319). The request just includes the Service ID, area of coverage and what is requested (handle the control plane and/or user plane data integrity for a critical transaction). Control plane data integrity refers to the secure onboarding/registration of the vertical devices 301 to a secure network. User plane data integrity refers to the secure transmission of the data via the enabler layer with the optional verification by the DLT network. A response/notify is sent back from the VAL server to the application specific server to notify on the result (e.g., ACK/NACK).

At Step 2, the VAL Server 309 sends a request to SEAL/IM server 307 to handle the identity management for the users involved within the requested transaction (see messaging 323). This request refers serves the purpose of generating identifiers for the registration to the target 5GS. This will trigger the IM server to request the identities of the VAL users for the transaction which is initiated by the requestee application.

At Step 3, a service response is sent back to the VAL server to notify on the result (e.g., OK, see messaging 321).

At Step 4, the SEAL/IM server 307 requests from all SEAL clients (corresponding to the particular Service) to send their digital identifiers (see messaging 325). While the embodiments of FIGS. 3A-3B are described in terms of a Decentralized Identifier ("DID"), in other embodiments another type of digital ID may be used. Each application of the vertical device 301 may have pre-configured one or more DIDs as provided by the applications. Note that the DID request message may be a broadcast ("BC") or groupcast ("GC") message. Contents of the DID request may include one or more of:

Application identifier
Service identifier
SEAL Group identifier
DID request indication Upon receiving DID request at step 4, the vertical device 301 either generates a DID for the service provided by application server or uses a preconfigured DID (see block 327).

At Step 5, the SEAL/IM server 307 receives a message including the DIDs of the corresponding devices (see messaging 329). This DID response message may include one or more of:

IM client ID
Application ID
DID

At Step 6, the SEAL/IM server 307 sends a verification request to the DTVN 313 (see messaging 331). The request message may include one or more of:

Transaction ID
Transaction type/criticality
List of DIDs
Application Server ID (e.g., IP address)
Middleware ID (e.g., FQDN, IP address)
Application client IDs (e.g., OS IDs)
List of DIDs
Time window for verification Continuing on FIG. 3B, the DTVN 313 performs verification processing (see block 333).

At Step 7, the SEAL/IM server 307 receives a verification response (see messaging 335) and generates the VAL user IDs (or VAL group ID) after the verification (i.e., only generates for the verified vertical devices 301, see block 337). The verification response/report may include one or more of:

Verification result (i.e., Yes/No)
List of verified DIDs
User plane verification required (e.g., if the consensus is based on marginal majority, low number of votes, . . . )

At Step 8, the SEAL/IM server 307 sends to the VAL server 309, the generated list of VAL user IDs for which the request applies (see messaging 339). This message may include one or more of the following:

IM server ID
SEAL client IDs
Verified DID list At Step 9, the VAL server 309 (e.g., acting as AF) provides a request to a UDM in the 5GC/NPN 305, via NEF, to add the tuple <DID, generated VAL-user IDs> at the subscription for the application #1 (see messaging 341). This message may include one or more of the following:

AF ID
One or more DIDs corresponding to the VAL UE entries to be added
One or more VAL-user IDs corresponding to the VAL UE entries to be added
One or more VAL group IDs
Request to use DID as SUPI
Request to use DID as SUCI
Request to use VAL-user ID as GPSI/external ID At Step 10 (optional), the VAL server 309 receives a response from the UDM in 5GS/NPN 305 as an acknowledgement to the request(s) (see messaging 343)

At Step 11, the VAL server 309 notifies the vertical devices 301 (i.e., the VAL clients 303) to trigger a registration request using the DIDs (see messaging 345). This message may include one or more of the following:

VAL server ID
Registration trigger indication
PLMN ID/NPN ID
Indication to use the DID as SUPI
Indication to use the DID as SUCI The vertical devices 301 connect to the 5GS/NPN 305 by performing registration and PDU session establishment procedures (see block 347). In one embodiment, the vertical devices 301 and 5GS/NPN 305 perform 3GPP registration and PDU session establishment as defined in 3GPP TS 23.502.

Note that similar procedure can be provided for MSGin5G, FFAPP, V2XAPP, EDGEAPP architectures, where the role of VAL layer can be the FAE server/client, VAE server/client, MSGin5G server/client, Edge Enabler Server/client. An IM server 307 may provide services to these VAL servers 309 as mentioned above. Also note that the VAL server 309 and SEAL/IM server 307 may be the same entity (or co-located) in certain embodiments.

Figure 4:
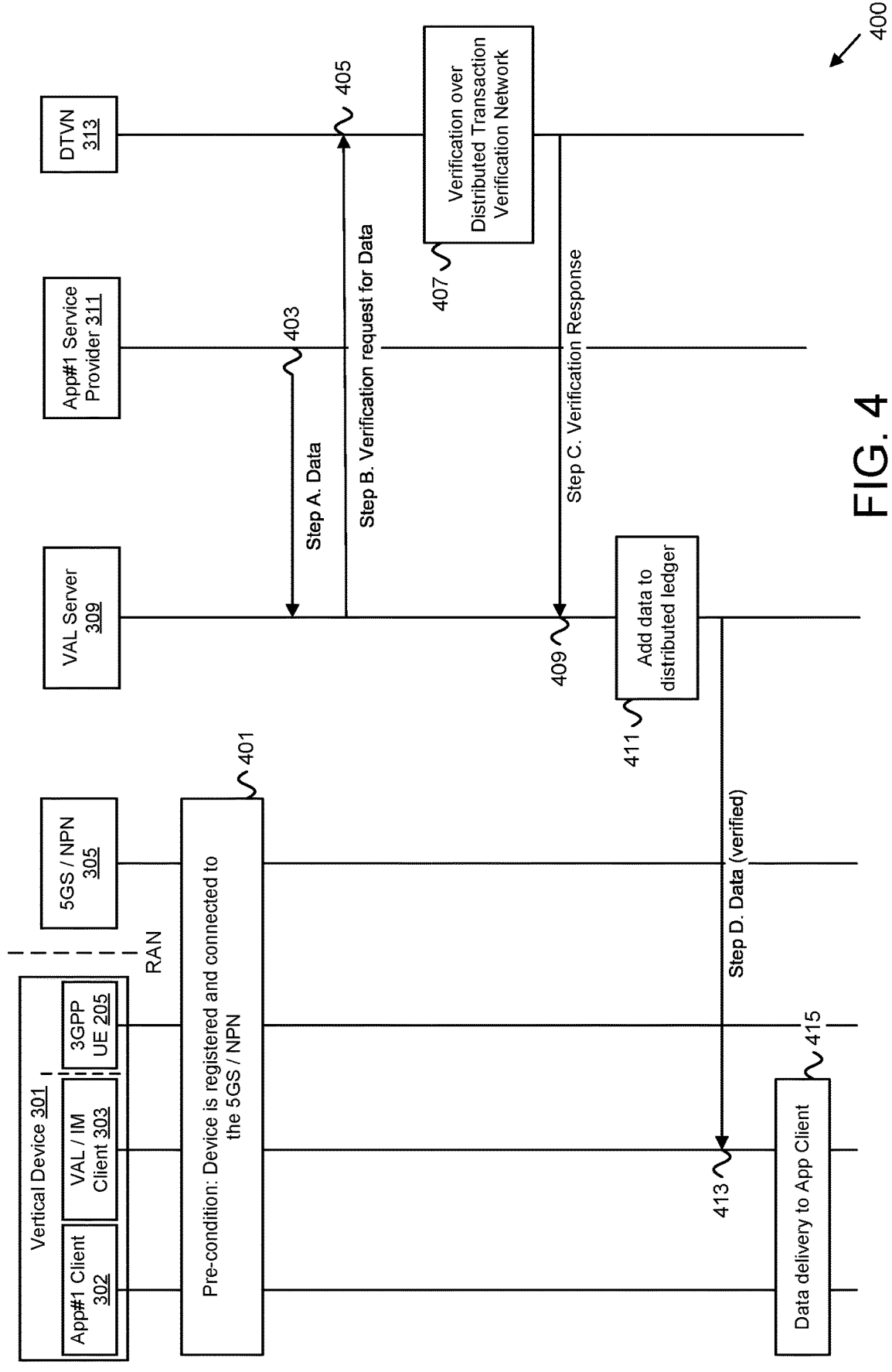
FIG. 4 is a diagram illustrating signaling flow for one embodiment of a procedure for middleware enabled user plane protection.

FIG. 4 depicts a procedure 400 for middleware enabled user plane protection, according to embodiments of the disclosure. The procedure 400 involves the vertical device 301 comprising the application client 302 for the first application (referred to as "App #1"), the VAL/IM client 303, and the UE 305. The procedure 400 also involves the 5GS/NPN 305, the VAL server 309, the App #1 Service Provider 311, and the distributed transaction verification network ("DTVN") 313, described above.

Turning to the message flow of FIG. 4, at Step 0, as a precondition, the vertical device 301 is registered and connected to the 5GS/NPN 305 (see block 401). Here, registration may be as described above with reference to FIG. 2 and/or FIGS. 3A-3B.

At Step A: The App #1 Server 311 (e.g., IoT server) wants to deliver the data to the vertical device 301 (e.g., an IoT device). However, if this is decided to be done over the enabler layer, the App #1 Server 311 sends one or more messages to the VAL server 309 (e.g., the enabler layer/ middleware). Optionally, before sending the data, the App #1 Server 311 sends a request to the VAL server 309 to handle the delivery (see messaging 403).

At Step B: The VAL server 309 (enabler server/middleware) sends a request for the verification of the data from the distributed transaction verification network 313, which can be a trust service provider ("TSP") and/or DLT/blockchain network (see messaging 405). The is verification request message may include one or more of the following:

Transaction ID
Transaction type/criticality
Application Server ID (e.g. IP address)
Middleware ID (e.g. FQDN, IP address)
UE IDs (e.g. DIDs)
Data to be verified
Time window for verification The distributed transaction verification network 313 performs verification (see block 407).

At Step C: The VAL server 309 (enabler server/middleware) receives a response for the verification of the data from the blockchain network (see messaging 409). This verification includes the verification result (yes, no) and information on how the verification was achieved.

If the transaction is verified, the VAL server 309 (enabler server/middleware) adds the new block to the blockchain (if the DLT technology is blockchain) or if it is not blockchain-based the middleware adds the data to the ledger (see block 411). To clarify, the distributed transaction verification network (e.g., blockchain/DLT network) will verify the transaction and, upon verification (e.g. using consensus algorithms), the data will be added to the ledger. This may be performed in two ways, referred to as Option A and Option B.

Under Option A, the middleware is part of the DLT/ blockchain network. Here, the VAL server 309 will add the data to the ledger when requesting verification from the DLT network (see it as a "pending approval ledger"). A consensus is achieved by the majority of the DLT nodes. This is also sent to the middleware which confirms the transaction and stores the ledger (the new ledger database with the data that the middleware added is valid). Then the VAL server 309 sends the data to the devices (note that the full ledger is not sent to the devices, just the data).

Under Option B, the VAL server 309 (enabler server/ middleware) is not part of the DLT/blockchain network. Thus, the middleware will send a request to the external DLT/blockchain network. The middleware will ask for a verification from an external node including the copy of the data to be verified, then data will be added to the ledger, e.g., by the node (i.e. TSP) which interacts with the middleware. Next, the ledger will be verified (via consensus with the DLT network), then the verification result will be sent to the middleware (i.e., OK msg). Finally, the VAL server 309 delivers the data to the devices.

At Step D: The VAL server 309 sends the data to the enabler clients of the vertical devices 301 which are verified to receive the data (see messaging 413). In one embodiment, the VAL server 309 sends the data over VAL-UU interface which is defined in 3GPP TS 23.434. The application clients 302 of the vertical devices 301 receive the data from the enabler clients 303 (see block 415). In one embodiment, the App #1 client 302 is a cloud-based client. In another embodiment, the App #1 client 302 is a local client of the vertical device 301.

Note that similar procedure can be provided for MSGin5G, FFAPP, V2XAPP, EDGEAPP architectures, where the role of VAL layer can be the FAE server/client, VAE server/client, MSGin5G server/client, Edge Enabler Server/client. Also note that the VAL server 309 and SEAL/ IM server 307 may be the same entity (or co-located) in certain embodiments.

Figure 5:
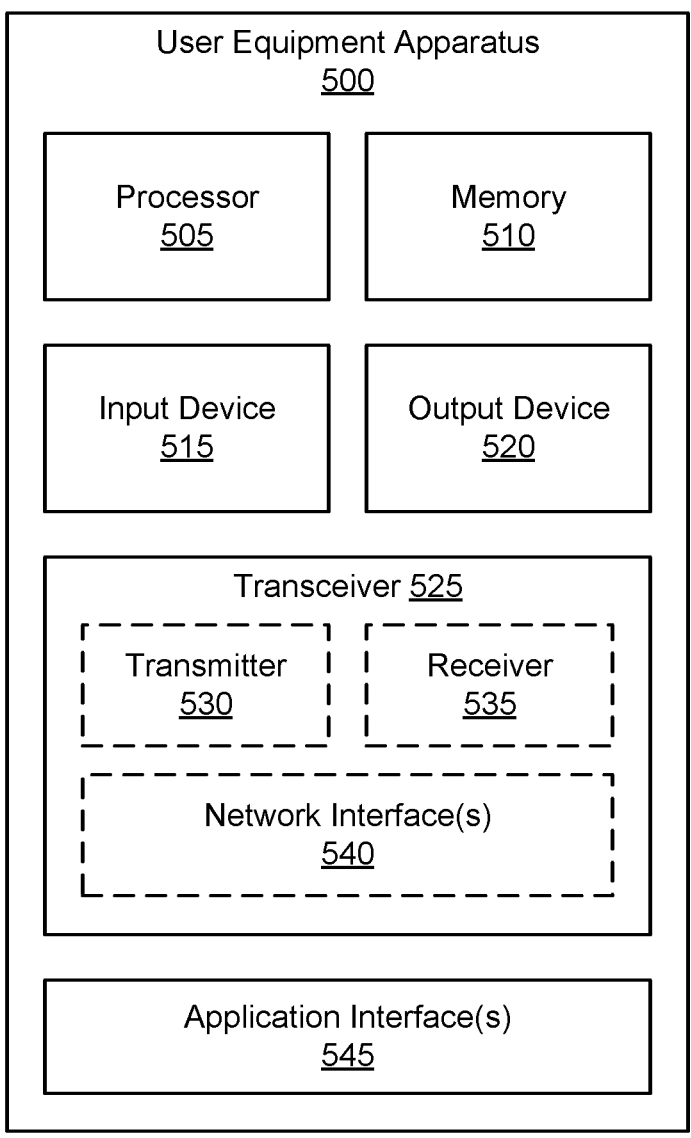
FIG. 5 is a diagram illustrating one embodiment of a user equipment apparatus that may be used for managing the end to end data protection using DLT-enabled verification.

FIG. 5 depicts a user equipment apparatus 500 that may be used for managing the end to end data protection using DLT-enabled verification, according to embodiments of the disclosure. In various embodiments, the user equipment apparatus 500 is used to implement one or more of the solutions described above. The user equipment apparatus 500 may be implemented in a vertical device, such as the remote unit 105, the client device 201, and/or the vertical device 301, described above. Furthermore, the user equipment apparatus 500 may include a processor 505, a memory 510, an input device 515, an output device 520, and a transceiver 525. In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. Here, the transceiver 525 communicates with one or more remote units 105. Additionally, the transceiver 525 may support at least one network interface 540. In some embodiments, the transceiver 525 supports a first interface (e.g., Uu interface) for communicating with one or more base units in a RAN, a second interface (e.g., N1 interface) for communicating with a AMF, and a third interface for communicating with a TSN system.

The processor 505, in one embodiment, may include any known controller capable of executing computer-readable instructions and/or capable of performing logical operations.

For example, the processor 505 may be a microcontroller, a microprocessor, a central processing unit ("CPU"), a graphics processing unit ("GPU"), an auxiliary processing unit, a FPGA, or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525. In various embodiments, the processor 505 controls the user equipment apparatus 500 to implement the above described UE behaviors, client device behaviors, and/or vertical device behaviors.

The user equipment apparatus 500 supports one or more application interfaces 545. Each application interface 545 supports communication among application instances running on the user equipment apparatus 500 and/or supports communication with an external application instance, e.g., running on a network device or a UE. In some embodiments, the application interface(s) 545 include a set of functions and procedures that allow for applications running on the user equipment apparatus 500 to access data and features of other applications, services, or operating systems. For example, a FAE client running on the user equipment apparatus 500 may use an application interface 545 to communicate with a FAE server. As another example, a V2X application running on the user equipment apparatus 500 may use an application interface 545 to communicate with a V2X application server.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to for managing the end to end data protection using DLT-enabled verification. For example, the memory 510 may store service requirements, DIDs, mappings, application requirements, related parameters, and the like. In certain embodiments, the memory 510 also stores program code and related data, such as an operating system or other controller algorithms operating on the remote unit 105.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

In various embodiments, the transceiver 525 is configured to communicate with 3GPP access network(s) and/or the non-3GPP access network(s). In some embodiments, the transceiver 525 implements modem functionality for the 3GPP access network(s) and/or the non-3GPP access network(s). In one embodiment, the transceiver 525 implements multiple logical transceivers using different communication protocols or protocol stacks, while using common physical hardware.

In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

The transceiver 525 may include one or more transmitters 530 and one or more receivers 535. Although a specific number of transmitters 530 and receivers 535 are illustrated, the user equipment apparatus 500 may have any suitable number of transmitters 530 and receivers 535. Further, the transmitter(s) 530 and the receiver(s) 535 may be any suitable type of transmitters and receivers. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like.

In various embodiments, one or more transmitters 530 and/or one or more receivers 535 may be implemented and/or integrated into a single hardware component, such as a multi-transceiver chip, a system-on-a-chip, an application-specific integrated circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module. In certain embodiments, the transceiver 525 may implement a 3GPP modem (e.g., for communicating via NR or LTE access networks) and a non-3GPP modem (e.g., for communicating via Wi-Fi or other non-3GPP access networks).

Figure 6:
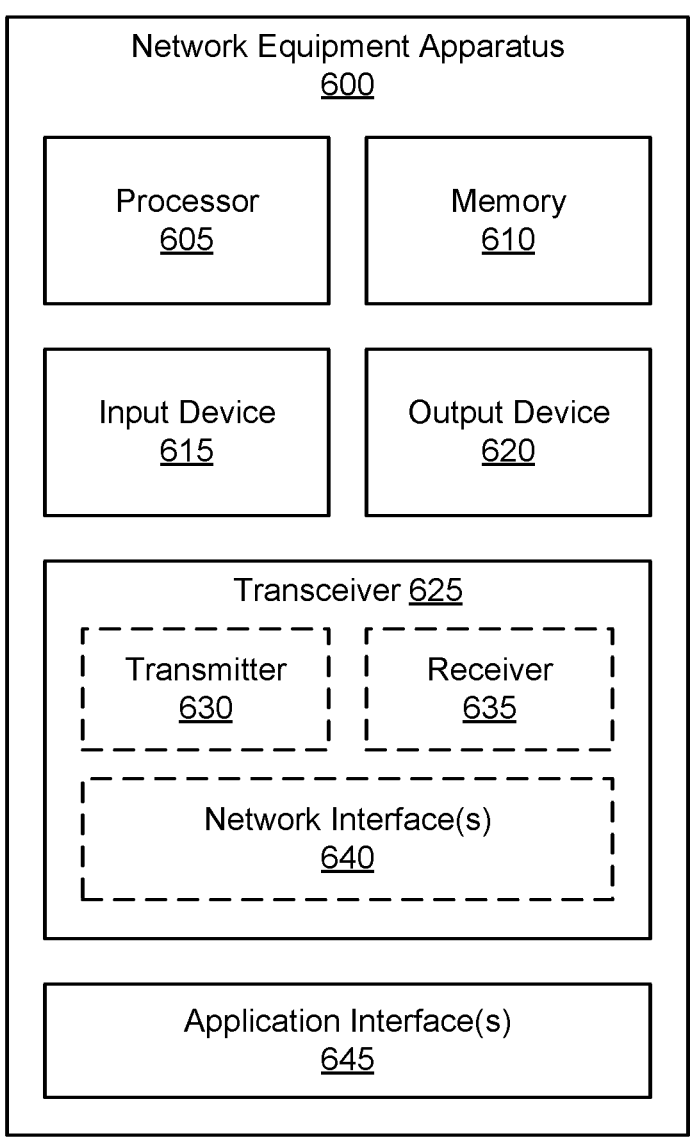
FIG. 6 is a diagram illustrating one embodiment of a network equipment apparatus that may be used for managing the end to end data protection using DLT-enabled verification.

FIG. 6 depicts one embodiment of a network equipment apparatus 600 that may be used for managing the end to end data protection using DLT-enabled verification, according to embodiments of the disclosure. In some embodiments, the network equipment apparatus 600 may be one embodiment of a trusted application entity (e.g., middleware), such as the VAL server 151, the IM server 153, the edge enabler server 145, the enabler server 213, the SEAL/IM server 307, and/or the VAL server 309. Furthermore, network equipment apparatus 600 may include a processor 605, a memory 610, an input device 615, an output device 620, a transceiver 625. In some embodiments, the input device 615 and the output device 620 are combined into a single device, such as a touch screen. In certain embodiments, the network equipment apparatus 600 does not include any input device 615 and/or output device 620.

As depicted, the transceiver 625 includes at least one transmitter 630 and at least one receiver 635. Here, the transceiver 625 communicates with one or more remote units 105. Additionally, the transceiver 625 may support at least one network interface 640, such as the N1, N2, and N3 interfaces. In some embodiments, the transceiver 625 supports a first interface for communicating with one or more network functions in a mobile core network (e.g., a 5GC and/or EPC), a second interface for communicating with a TSN system, and a third interface for communicating with a remote unit (e.g., UE).

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In various embodiments, the processor 605 controls the user equipment apparatus 600 to implement the above described network behaviors.

Via the transceiver 625, the processor 605 receives a management requirement for managing e2e data protection for at least one service from an application server (e.g., application server 213 or App #1 service provider 311). The processor 605 obtains at least one DIG-ID of at least one client device for the at least one service in response to receiving the management requirement and verifies the at least one DIG-ID with a DTVN (e.g., distributed transaction verification network 160, DTVN 219, or DVTN 313). In one embodiment, the DTVN comprises a TSP. In another embodiment, the DTVN comprises a DLT network, such as a blockchain network.

The processor 605 controls the transceiver 625 to send a request to a mobile communication network (e.g., PLMN, NPN, MNO, CN), the request providing the at least one verified DIG-ID (e.g., for the at least one IoT device). Here, the at least one verified DIG-ID allows service provisioning of the at least one client device in the mobile communication network (i.e., the network selected for this transaction) and sends a trigger event to the at least one client device (e.g., having verified digital identifiers) for connecting to the mobile communication network using the at least one verified DIG-ID.

In some embodiments, the service corresponds to one of: a geographical service area, an edge enabler service area (i.e., a service area that is served by an EES in an EDN), an EDN service area, an application service identity, and/or a service type identity. In certain embodiments, the management requirement is in form of a subscription for the at least one service. In other embodiments, the management requirement is in form of a one-time request for the at least one service.

In certain embodiments, the management requirement corresponds to a request to the trusted application entity for e2e data protection for a control plane transaction (i.e., to support the secure registration/onboarding of the relevant devices to a PLMN/NPN). In other embodiments, the management requirement corresponds to a request for e2e data protection for a user plane transaction. In one embodiment, such a request may be to an external entity (e.g., to manage e2e data protection for a control plane transaction). In another embodiment, the request is made to an internal entity.

In some embodiments, obtaining the at least one DIG-ID comprises sending a second request to the at least one client device in response to receiving the management requirement and receiving the at least one DIG-ID in response to the second request. In certain embodiments, the second request is carried via application enabler layer signaling, wherein the second request comprises one or more of the following parameters: 1) a request for a DIG-ID corresponding to the client device; 2) a service identifier; and/or 3) a configuration of DIG-ID reporting.

In some embodiments, verifying the at least one DIG-ID includes sending a verification request to the distributed transaction verification network and receiving a verification response from the distributed transaction verification network. In some embodiments, the trusted application entity (e.g., application enabler and/or middleware) is a DLT-enabled node. In such embodiments, the middleware is also "part" of the DLT (e.g., blockchain network). In some embodiments, the at least one verified DIG-ID is usable as a subscription identifier by the at least one client device for subscribing with the mobile communication network.

In some embodiments, sending the request to the mobile communication network comprises sending a request to a 5G core network function (e.g., a UDM) to update a subscription corresponding to the application with the at least one verified DIG-ID. In certain embodiments, the request to the mobile communication network comprises one or more of the following parameters: 1) an application function identifier corresponding to the trusted application entity (i.e., where the VAL server acts as AF); 2) a list of one or more DIG-IDs corresponding to VAL UE entries to be added; 3) a list of one or more VAL-user IDs corresponding to the VAL UE entries to be added; 4) a list of one or more VAL group IDs; 5) a request to use DIG-ID as SUPI; 6) a request to use DIG-ID as SUCI; and/or 7) a request to use a VAL-user ID as a GPSI/external ID.

In some embodiments, the trigger event is provided via application enabler layer signaling, wherein the trigger event comprises one or more of the following parameters: 1) a VAL server ID; 2) a registration trigger indication; 3) a PLMN ID (e.g., a combination of mobile country code ("MCC") and mobile network code ("MNC")); 4) a NPN ID; 5) an indication to use the DIG-ID as a SUPI; and/or 6) an indication to use the DIG-ID as a SUCI. In some embodiments, the trigger event provides assistance information for switching to a secure network (e.g., provides PLMN IDs, NPN IDs, etc. for the at least one client device).

In various embodiments, the transceiver 625 that receives user plane data for verification for at least one client device based on an accepted user plane transaction. The processor 605 verifies the user plane data with a DTVN and receives a verification result from the DTVN. The transceiver 625 sends the verified data to the at least one client device. In some embodiments, receiving the user plane data comprises receiving from an application server, the method further comprising receiving a delivery request from an application server prior to receiving the user plane data. In some embodiments, verifying the user plane data comprises sending a verification request comprising one or more of the following parameters: 1) a Transaction ID; 2) a Transaction type; 3) a Transaction criticality level; 4) an Application Server ID (e.g., represented by an IP address); 5) a Middleware ID (e.g., represented by a FQDN or by an IP address); 6) a list of one or more UE IDs (e.g., represented by DIG-IDs); 7) the user data to be verified; 8) the ledger to be verified (including the user plane data); and/or 9) a time window for verification.

In some embodiments, receiving the verification result comprises receiving a verified distributed ledger from the DTVN. In one embodiment, the DTVN comprises a TSP. In another embodiment, the DTVN comprises a DLT network, such as a blockchain network. In some embodiments, the trusted application entity comprises an application enabler server, wherein sending the verified data to the at least one client device comprises sending via application enabler layer signaling to a corresponding application enabler client at the client device. In some embodiments, sending the verified data to the at least one client device comprises sending to the client device an address in the DLT network, wherein the at least one client device downloads the verified data from the address in the DLT network.

The network equipment apparatus 600 supports one or more application interfaces 645. Each application interface 645 supports communication among application instances running on the user equipment apparatus 600 and/or supports communication with an external application instance, e.g., running on a network device or a UE. In some embodiments, the application interface(s) 645 include a set of functions and procedures that allow for applications running on the network equipment apparatus 600 to access data and features of other applications, services, or operating systems. As described in further detail below, a FAE client running on the network equipment apparatus 600 may use an application interface 645 to communicate with a FAE server. As another example, a TSN application running on the network equipment apparatus 600 may use an application interface 645 to communicate with a TSN application server.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data relating to for managing the end to end data protection using DLT-enabled verification, for example storing service requirements, QoS requirements, QoE requirements, mappings, application requirements, related parameters, and the like. In certain embodiments, the memory 610 also stores program code and related data, such as an operating system ("OS") or other controller algorithms operating on the network equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 may communicate with one or more remote units and/or with one or more network functions that provide access to one or more PLMNs. The transceiver 625 may also communicate with one or more network functions (e.g., in the mobile core network 120). The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like. In one embodiment, the transceiver 625 implements multiple logical transceivers using different communication protocols or protocol stacks, while using common physical hardware.

FIG. 7 depicts one embodiment of a method 700 for managing the end to end data protection using DLT-enabled verification, according to embodiments of the disclosure. In various embodiments, the method 700 is performed by a trusted application entity (e.g., middleware), such as the VAL server 151, the IM server 153, the edge enabler server 145, the enabler server 213, the SEAL/IM server 307, the VAL server 309, described above. In some embodiments, the method 700 is performed by a processor, such as a microcontroller, a microprocessor, a CPU, a GPU, an auxiliary processing unit, a FPGA, or the like.

The method 700 begins and receives 705—from an application server—a management requirement for managing end-to-end data protection for at least one service. The method 700 includes obtaining 710 at least one digital identifier ("DID") of at least one client device for the at least one service in response to receiving the management requirement. The method 700 includes verifying 715 the at least one DID with a DTVN.

The method 700 includes sending 720 a request to a mobile communication network, the request providing the at least one verified DID, where the at least one verified DID allows service provisioning of the at least one client device in the mobile communication network. The method 700 includes sending 725 a trigger event to the at least one client device for connecting to the mobile communication network using the at least one verified DID. The method 700 ends.

FIG. 8 depicts one embodiment of a method 800 for managing the end to end data protection using DLT-enabled verification, according to embodiments of the disclosure. In various embodiments, the method 800 is performed by a trusted application entity (e.g., middleware), such as the VAL server 151, the IM server 153, the edge enabler server 145, the enabler server 213, the SEAL/IM server 307, and/or the VAL server 309, described above. In some embodiments, the method 800 is performed by a processor, such as a microcontroller, a microprocessor, a CPU, a GPU, an auxiliary processing unit, a FPGA, or the like.

The method 800 begins and received 805 user plane data for verification for at least one client device based on an accepted user plane transaction. The method 800 includes verifying 810 the user plane data with a DTVN. The method 800 includes receiving 815 a verification result from the DTVN. The method 800 includes 820 sending the user plane data to the at least one client device, based on the successful verification result. The method 800 ends.

Disclosed herein is a first apparatus for managing the end to end data protection using DLT-enabled verification, according to embodiments of the disclosure. The first apparatus may be implemented by a trusted application entity (e.g., middleware), such as the VAL server 151, the IM server 153, the edge enabler server 145, the enabler server 213, the SEAL/IM server 307, the VAL server 309, and/or the network apparatus 700. The first apparatus includes a transceiver that receives, from an application server, a management requirement for managing e2e data protection for at least one service. The first apparatus includes a processor that obtains at least one DIG-ID of at least one client device for the at least one service in response to receiving the management requirement and verifies the at least one DIG-ID with a DTVN. In one embodiment, the DTVN comprises a TSP. In another embodiment, the DTVN comprises a DLT network, such as a blockchain network.

The transceiver sends a request to a mobile communication network (e.g., PLMN, NPN, MNO, CN), the request providing the at least one verified DIG-ID (e.g., for the at least one IoT device), wherein the at least one verified DIG-ID allows service provisioning of the at least one client device in the mobile communication network (i.e., the network the enabler has chosen for this transaction) and sends a trigger event to the at least one client device (e.g., having verified digital identifiers) for connecting to the mobile communication network using the at least one verified DIG-ID.

In some embodiments, the service corresponds to one of: a geographical service area, an edge enabler service area, an edge data network service area, an application service identity, and/or a service type identity. In some embodiments, the management requirement corresponds to a request to the trusted application entity for e2e data protection for a control plane transaction.

In some embodiments, the management requirement corresponds to a request for e2e data protection for a user plane transaction. In some embodiments, the management requirement is in form of: a subscription for the at least one service or a one-time request for the at least one service.

In some embodiments, obtaining the at least one DIG-ID comprises sending a second request to the at least one client device in response to receiving the management requirement and receiving the at least one DIG-ID in response to the second request. In certain embodiments, the second request is carried via application enabler layer signaling, wherein the second request comprises one or more of the following parameters: 1) a request for a DIG-ID corresponding to the client device; 2) a service identifier; and/or 3) a configuration of DIG-ID reporting.

In some embodiments, verifying the at least one DIG-ID includes sending a verification request to the distributed transaction verification network and receiving a verification response from the distributed transaction verification network. In some embodiments, the trusted application entity (e.g., application enabler and/or middleware) is a DLT-enabled node. In some embodiments, the at least one verified DIG-ID is usable as a subscription identifier by the at least one client device for subscribing with the mobile communication network.

In some embodiments, sending the request to the mobile communication network comprises sending a request to a 5G core network function (e.g., a UDM) to update a subscription corresponding to the application with the at least one verified DIG-ID. In certain embodiments, the request to the mobile communication network comprises one or more of the following parameters: 1) an application function identifier corresponding to the trusted application entity (i.e., where the VAL server acts as AF); 2) a list of one or more DIG-IDs corresponding to VAL UE entries to be added; 3) a list of one or more VAL-user IDs corresponding to the VAL UE entries to be added; 4) a list of one or more VAL group IDs; 5) a request to use DIG-ID as SUPI; 6) a request to use DIG-ID as SUCI; and/or 7) a request to use a VAL-user ID as a GPSI/external ID.

In some embodiments, the trigger event is provided via application enabler layer signaling, wherein the trigger event comprises one or more of the following parameters: 1) a VAL server ID; 2) a registration trigger indication; 3) a PLMN ID (e.g., a combination of mobile country code ("MCC") and mobile network code ("MNC")); 4) a NPN ID; 5) an indication to use the DIG-ID as a SUPI; and/or 6) an indication to use the DIG-ID as a SUCI. In some embodiments, the trigger event provides assistance information for switching to a secure network (e.g., provides PLMN IDs, NPN IDs, etc. for the at least one client device).

Disclosed herein is a first method for managing the end to end data protection using DLT-enabled verification, according to embodiments of the disclosure. The first method may be performed by a trusted application entity (e.g., middleware), such as the VAL server 151, the IM server 153, the edge enabler server 145, the enabler server 213, the SEAL/IM server 307, the VAL server 309, and/or the network apparatus 600. The first method includes receiving from an application server a management requirement for managing e2e data protection for at least one service and obtaining at least one DIG-ID of at least one client device for the at least one service in response to receiving the management requirement. The first method includes verifying the at least one DIG-ID with a DTVN. In one embodiment, the DTVN comprises a TSP. In another embodiment, the DTVN comprises a DLT network, such as a blockchain network.

The first method includes sending a request to a mobile communication network (e.g., PLMN, NPN, MNO, CN), the request providing the at least one verified DIG-ID (for the at least one IoT device). In such embodiments, the at least one verified DIG-ID allows service provisioning of the at least one client device in the mobile communication network (e.g., the network the enabler has chosen for this transaction). The first method includes sending a trigger event to the at least one client device (having verified digital identifiers) for connecting to the mobile communication network using the at least one verified DIG-ID.

In some embodiments, the service corresponds to one of: a geographical service area, an edge enabler service area, an edge data network service area, an application service identity, and a service type identity. In some embodiments, the management requirement corresponds to a request to the trusted application entity for e2e data protection for a control plane transaction.

In some embodiments, the management requirement corresponds to a request for e2e data protection for a user plane transaction. In some embodiments, the management requirement is in the form of a subscription for the at least one service or in the form of a one-time request for the at least one service.

In some embodiments, obtaining the at least one DIG-ID comprises sending a second request to the at least one client device in response to receiving the management requirement and receiving the at least one DIG-ID in response to the second request. In certain embodiments, the second request is carried via application enabler layer signaling, wherein the second request comprises one or more of the following parameters: 1) a request for a DIG-ID corresponding to the client device; 2) a service identifier; and/or 3) a configuration of DIG-ID reporting.

In some embodiments, verifying the at least one DIG-ID includes sending a verification request to the distributed transaction verification network and receiving a verification response from the distributed transaction verification network. In some embodiments, the trusted application entity (e.g., application enabler and/or middleware) is a DLT-enabled node. In some embodiments, the at least one verified DIG-ID is usable as a subscription identifier by the at least one client device for subscribing with the mobile communication network.

In some embodiments, sending the request to the mobile communication network comprises sending a request to a 5G core network function (e.g., a UDM) to update a subscription corresponding to the application with the at least one verified DIG-ID. In certain embodiments, the request to the mobile communication network comprises one or more of the following parameters: 1) an application function identifier corresponding to the trusted application entity (e.g., where the VAL server acts as AF); 2) a list of one or more DIG-IDs corresponding to VAL UE entries to be added; 3) a list of one or more VAL-user IDs corresponding to the VAL UE entries to be added; 4) a list of one or more VAL group IDs; 5) a request to use DIG-ID as SUPI; 6) a request to use DIG-ID as SUCI; and/or 7) a request to use a VAL-user ID as a GPSI/external ID.

In some embodiments, the trigger event is provided via application enabler layer signaling, wherein the trigger event comprises one or more of the following parameters: 1) a VAL server ID; 2) a registration trigger indication; 3) a PLMN ID; 4) a NPN ID; 5) an indication to use the DIG-ID as a SUPI; and/or 6) an indication to use the DIG-ID as a SUCI. In some embodiments, the trigger event provides assistance information for switching to a secure network (e.g., provides PLMN IDs, NPN IDs, etc. for the at least one client device).

Disclosed herein is a second apparatus for managing the end to end data protection using DLT-enabled verification, according to embodiments of the disclosure. The second apparatus may be implemented by a trusted application entity (e.g., middlew are), such as the VAL server 151, the IM server 153, the edge enabler server 145, the enabler server 213, the SEAL/IM server 307, the VAL server 309, and/or the network apparatus 700. The second apparatus includes a transceiver that receives user plane data for verification for at least one client device based on an accepted user plane transaction. The second apparatus includes a processor that verifies the user plane data with a DTVN. The transceiver sends the verified data to the at least one client device, based on the successful verification result.

In some embodiments, receiving the user plane data comprises receiving from an application server, the method further comprising receiving a delivery request from an application server prior to receiving the user plane data. In some embodiments, verifying the user plane data comprises sending a verification request comprising one or more of the following parameters: 1) a Transaction ID; 2) a Transaction type; 3) a Transaction criticality level; 4) an Application Server ID (e.g., represented by an IP address); 5) a Middleware ID (e.g., represented by a FQDN or by an IP address); 6) a list of one or more UE IDs (e.g., represented by DIG-IDs); 7) the user data to be verified; 8) the ledger to be verified (including the user plane data); and/or 9) a time window for verification.

In some embodiments, receiving the verification result comprises receiving a verified distributed ledger from the DTVN. In such embodiments, the sending the user plane data to the at least one client device is based on the verified distributed ledger. In one embodiment, the DTVN comprises a TSP. In another embodiment, the DTVN comprises a DLT network, such as a blockchain network. In some embodiments, the trusted application entity comprises an application enabler server, wherein sending the verified data to the at least one client device comprises sending via application enabler layer signaling to a corresponding application enabler client at the client device. In some embodiments, sending the verified data to the at least one client device comprises sending to the client device an address in the DLT network, wherein the at least one client device downloads the verified data from the address in the DLT network.

Disclosed herein is a second method for managing the blockchain-enabled integrity protection of data transfer between two application entities, according to embodiments of the disclosure. The second method may be performed by a trusted application entity (e.g., middleware), such as the VAL server 151, the IM server 153, the edge enabler server 145, the enabler server 213, the SEAL/IM server 307, the VAL server 309, and/or the network apparatus 700. The second method includes receiving user plane data for verification for at least one client device based on an accepted user plane transaction. The second method includes verifying the user plane data with a DTVN and receiving a verification result from the DTVN. The second method includes sending the user plane data to the at least one client device, based on the successful verification result.

In some embodiments, receiving the user plane data comprises receiving from an application server, the method further comprising receiving a delivery request from an application server prior to receiving the user plane data. In some embodiments, verifying the user plane data comprises sending a verification request comprising one or more of the following parameters: 1) a Transaction ID; 2) a Transaction type; 3) a Transaction criticality level; 4) an Application Server ID (e.g., represented by an IP address); 5) a Middleware ID (e.g., represented by FQDN or by an IP address); 6) a list of one or more UE IDs (e.g., represented by DIG-IDs); 7) the user data to be verified; 8) the ledger to be verified (including the user plane data); and/or 9) a time window for verification.

In some embodiments, receiving the verification result comprises receiving a verified distributed ledger from the DTVN. In such embodiments, the sending the user plane data to the at least one client device is based on the verified distributed ledger. In one embodiment, the DTVN comprises a TSP. In another embodiment, the DTVN comprises a DLT network, such as a blockchain network. In some embodiments, the trusted application entity comprises an application enabler server, wherein sending the verified data to the at least one client device comprises sending via application enabler layer signaling to a corresponding application enabler client at the client device. In some embodiments, sending the verified data to the at least one client device comprises sending to the client device an address in the DLT network, wherein the at least one client device downloads the verified data from the address in the DLT network.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a trusted application entity, the method comprising:

receiving, from an application server, a management requirement for managing end-to-end ("e2e") data protection for at least one service;

obtaining at least one digital identifier ("DID") of at least one user equipment ("UE") for the at least one service in response to receiving the management requirement, wherein each respective DID is a verifiably secure identity comprising a decentralized and globally unique persistent identifier or a self-sovereign identifier;

verifying the at least one DID with a distributed transaction verification network associated with the at least one DID, wherein the distributed transaction verification network comprises a distributed ledger technology ("DLT") network, a blockchain network, or a trust service provider ("TSP") network;

transmitting a request to a mobile communication network, the request providing the at least one verified DID, wherein the at least one verified DID allows service provisioning of the at least one UE in the mobile communication network; and transmitting a trigger event to the at least one UE for connecting to the mobile communication network using the at least one verified DID.

2. The method of claim 1, wherein the service corresponds to one or more of: a geographical service area, an edge enabler service area, an edge data network service area, an application service identity, or a service type identity.

3. The method of claim 1, wherein the management requirement corresponds to a request to the trusted application entity for e2e data protection for a control plane transaction.

4. The method of claim 1, wherein the management requirement corresponds to a request for e2e data protection for a user plane transaction.

5. The method of claim 1, wherein the management requirement comprises:

a subscription for the at least one service; or a one-time request for the at least one service.

6. The method of claim 1, wherein obtaining the at least one DID comprises:

transmitting, prior to receiving the at least one DID, a second request to the at least one UE in response to receiving the management requirement; and wherein the at least one DID is received in response to the second request.

7. The method of claim 6, wherein the second request is carried via application enabler layer signaling, wherein the second request comprises the following parameters:

a request for a DID corresponding to the client device at least one UE;

a service identifier; and a configuration of DID reporting.

8. The method of claim 1, wherein verifying the at least one DID comprises:

transmitting a verification request to the distributed transaction verification network; and receiving a verification response from the distributed transaction verification network.

9. The method of claim 1, where the trusted application entity is a distributed ledger technology-enabled node.

10. The method of claim 1, wherein the at least one verified DID is usable as a subscription identifier by the at least one UE for subscribing with the mobile communication network.

11. The method of claim 1, wherein transmitting the request to the mobile communication network comprises transmitting a request to a 5G core network function for updating a subscription corresponding to the application with the at least one verified DID.

12. The method of claim 11, wherein the request to the mobile communication network comprises one or more of the following parameters:

an application function identifier corresponding to the trusted application entity;

a list of one or more DIDs corresponding to vertical application layer ("VAL") UE entries to be added;

a list of one or more VAL-user IDs corresponding to the VAL UE entries to be added;

a list of one or more VAL group IDs;

a request to use DID as SUPI;

a request to use DID as SUCI; or a request to use a VAL-user ID as a GPSI and/or external ID.

13. The method of claim 1, wherein the trigger event is provided via application enabler layer signaling, wherein the trigger event comprises one or more of the following parameters:

a vertical application layer ("VAL") server ID;

a registration trigger indication;

a PLMN ID;

a NPN ID;

an indication to use the DID as a subscription permanent identifier ("SUPI"); or an indication to use the DID as a subscription concealed identifier ("SUCI").

14. The method of claim 1, wherein the trigger event provides assistance information for switching to a secure network.

15. An apparatus providing a trusted application entity, comprising:

at least one memory; and at least one processor coupled with the at least one memory and configured to cause the apparatus to:

receive, from an application server, a management requirement for managing end-to-end ("e2e") data protection for at least one service;

obtain at least one digital identifier ("DID") of at least one UE for the at least one service in response to receiving the management requirement, wherein each respective DID is a verifiably secure identity comprising a decentralized and globally unique persistent identifier or a self-sovereign identifier;

verify the at least one DID with a distributed transaction verification network associated with the at least one DID, wherein the distributed transaction verification network comprises a distributed ledger technology ("DLT") network, a blockchain network, or a trust service provider ("TSP") network;

transmit a request to a mobile communication network, the request providing the at least one verified DID, wherein the at least one verified DID allows service provisioning of the at least one UE in the mobile communication network; and transmit a trigger event to the at least one UE for connecting to the mobile communication network using the at least one verified DID.

16. The apparatus of claim 15, wherein the service corresponds to one or more of: a geographical service area, an edge enabler service area, an edge data network service area, an application service identity, or a service type identity.

17. The apparatus of claim 15, wherein the management requirement corresponds to a request to the trusted application entity for e2e data protection for a control plane transaction.

18. The apparatus of claim 15, wherein the management requirement corresponds to a request for e2e data protection for a user plane transaction.

19. The apparatus of claim 15, wherein the management requirement comprises:

a subscription for the at least one service, or a one-time request for the at least one service.

20. The apparatus of claim 15, wherein to obtain the at least one DID, the at least one processor is configured to cause the apparatus to:

transmit, prior to receiving the at least one DID, a second request to the at least one UE in response to receiving the management requirement; and wherein the at least one DID is received in response to the second request.

* * * * *